United States Patent
Molina

[11] Patent Number: 5,890,352
[45] Date of Patent: Apr. 6, 1999

[54] ROTARY CUTTING ASSEMBLY

[76] Inventor: Luis Molina, 1940 Genesta St., San Diego, Calif. 92112

[21] Appl. No.: 73,315

[22] Filed: May 4, 1998

[51] Int. Cl.$^6$ .................................................. A01D 34/68
[52] U.S. Cl. ............................. 56/12.7; 56/295; 30/276
[58] Field of Search ..................... 30/276, 347, DIG. 5; 56/12.7, 255, 295, 289, 17.5, DIG. 17, DIG. 20; 172/15, 17

[56] References Cited

U.S. PATENT DOCUMENTS

| | | | |
|---|---|---|---|
| 4,461,138 | 7/1984 | Whitman | 56/12.7 |
| 5,048,278 | 9/1991 | Jones et al. | 56/295 |
| 5,461,787 | 10/1995 | Araki et al. | 30/276 |
| 5,615,543 | 4/1997 | Caffey et al. | 56/295 |
| 5,617,636 | 4/1997 | Taggett et al. | 30/276 |
| 5,649,413 | 7/1997 | Oostendorp | 56/12.7 |

*Primary Examiner*—Thomas B. Will
*Assistant Examiner*—Robert Pezzuto
*Attorney, Agent, or Firm*—Goldstein & Canino

[57] ABSTRACT

A rotary cutting assembly to be attached to a rotary shaft of a weed trimming device for cutting vegetation. The rotary cutting assembly includes a cutting member constructed of a hub and a plurality of cable ties secured to the hub such that a spoke pattern is formed. Due to the cable ties' relatively heavy mass and ability to resist a wide range of dynamic stresses that may be placed thereon during normal operation of the weed trimming device, the cutting member of the present invention can be used to cut through thick and dense vegetation. The cutting member is encased between a top cover and a bottom casing. The bottom casing is defined in part by a semi-dome shaped portion which is sized to engage the outer periphery of the top cover to encapsulate the cutting member to ensure that the hub and the head portion of the cable ties remain protected and insulated from the environmental elements typically encountered by weed trimming device.

4 Claims, 2 Drawing Sheets

ROTARY CUTTING ASSEMBLY

BACKGROUND OF THE INVENTION

This invention relates to a rotary cutting assembly for a rotary lawn mower, edger, trimmer or the like. More particularly, the invention relates to a rotary cutting assembly which employs a hub and a plurality of cable ties secured thereto such that the free ends of the cable ties extend outward radially therefrom designed to slice through targeted vegetation.

Lawn trimmers are devices which cut grass, weeds and other forms of above-ground vegetation by means of a unitary soft, pliable nylon cord which extends outward from a rotating body. Typically, the rotating body is affixed to a correspondingly rotatable rotary shaft and partially enclosed by a housing having an open bottom. As the rotating body spins upon the rotary shaft, the outwardly extending pliable nylon cord quickly strikes target objects in its path (such as blades of grass, weeds, etc.) and cuts down said vegetation. The low mass and hence low kinetic energies, in conjunction with the flexible nature of said pliable nylon cords unfortunately results in an inability to cut larger, denser forms of vegetation. Furthermore, the single pliable nylon cord also causes the rotating body of the device to feel unbalanced in the hands of the user as it rotates unevenly, driven by the rotary shaft.

To compensate for the unbalanced rotation of weed cutters with single pliable nylon cords, the prior art discloses devices having a plurality of pliable nylon cords. While this does resolve the problem of imbalance found in the single cord devices, the pliable nature of the cord still renders it incapable of cutting thick and dense vegetation.

While these units mentioned above may be suitable for the particular purpose employed, or for general use, they would not be as suitable for the purposes of the present invention as disclosed hereafter.

SUMMARY OF THE INVENTION

It is an object of the invention to provide a rotary cutting assembly which is simple in construction so as to minimize manufacturing costs, and yet is capable of cutting thick vegetation.

It is another object of the invention to provide a rotary cutting assembly which can be readily secured to an existing weed trimming device.

It is yet another object of the invention to provide a rotary cutting assembly employing a plurality of cable ties secured to a hub in a spoke pattern designed to promote balance during use.

It is further object of the invention to provide a rotary cutting assembly which utilizes cable ties that are sufficiently heavy and durable to cut through dense vegetation while being capable of resisting a wide range of dynamic stresses that may be placed thereon during normal operation.

The invention is a rotary cutting assembly to be attached to a rotary shaft of a weed trimming device for cutting vegetation. The rotary cutting assembly includes a cutting member constructed of a hub and a plurality of cable ties secured to the hub such that a spoke pattern is formed. Due to the cable ties' relatively heavy mass and ability to resist a wide range of dynamic stresses that may be placed thereon during normal operation of the weed trimming device, the cutting member of the present invention can be used to cut through thick and dense vegetation. The cutting member is encased between a top cover and a bottom casing. The bottom casing is defined in part by a semi-dome shaped portion which is sized to engage the outer periphery of the top cover to encapsulate the cutting member to ensure that the hub and the head portion of the cable ties remain protected and insulated from the environmental elements typically encountered by weed trimming device.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
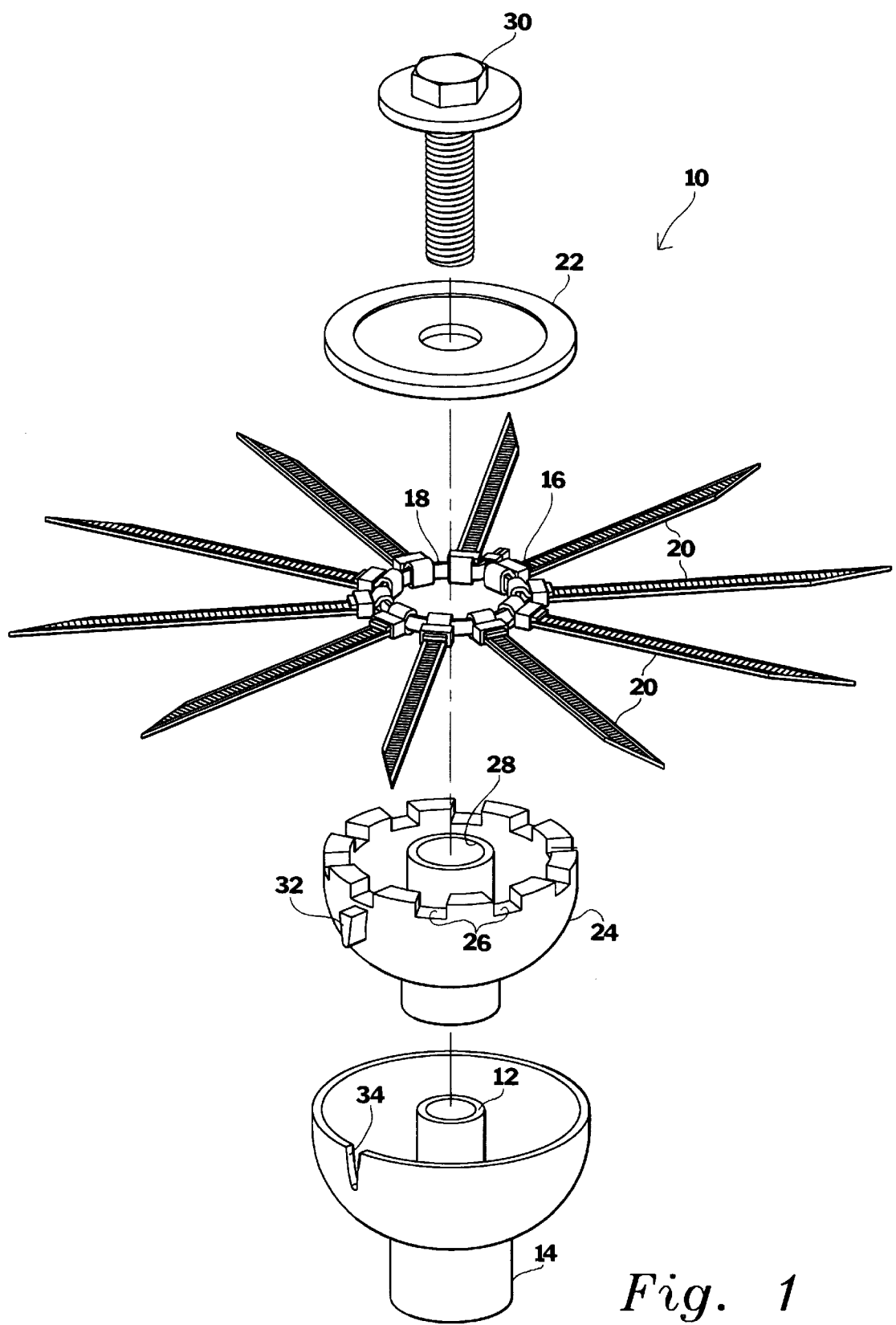
FIG. 1 is an exploded view of a rotary cutting assembly of the instant invention, illustrating from top to bottom, a bolt, a top cover, a cutting member, a bottom casing, and a rotary shaft of a weed trimming device.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the rotary cutting assembly. The words "proximal end" and "distal end" refer, respectively, to ends of an object nearer to and further from the operator of the object when the object is used in a normal fashion or as is described in the specification.

Figure 2:
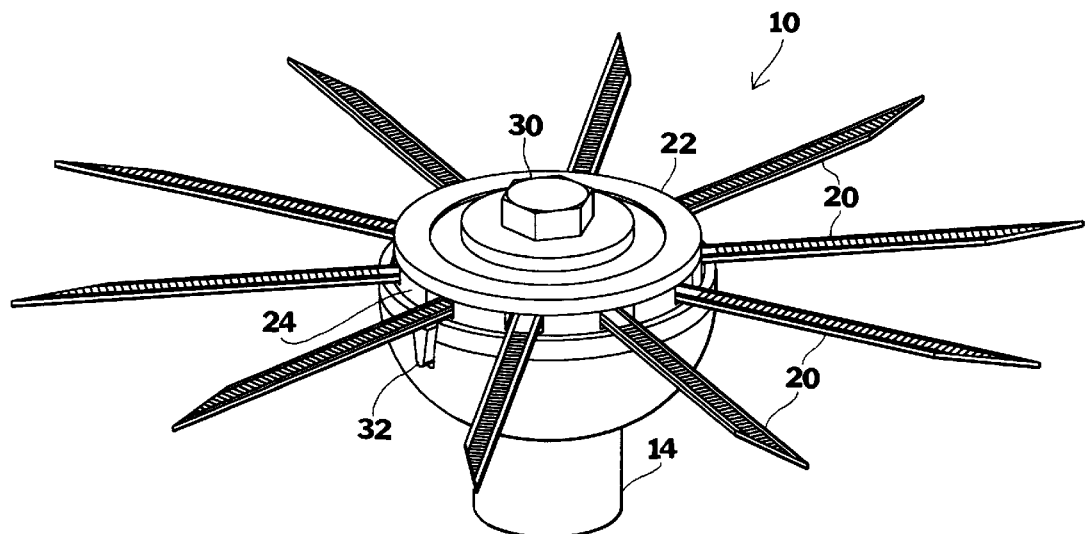
FIG. 2 is a diagrammatic perspective view of the rotary cutting assembly of the instant invention.
Figure 3:
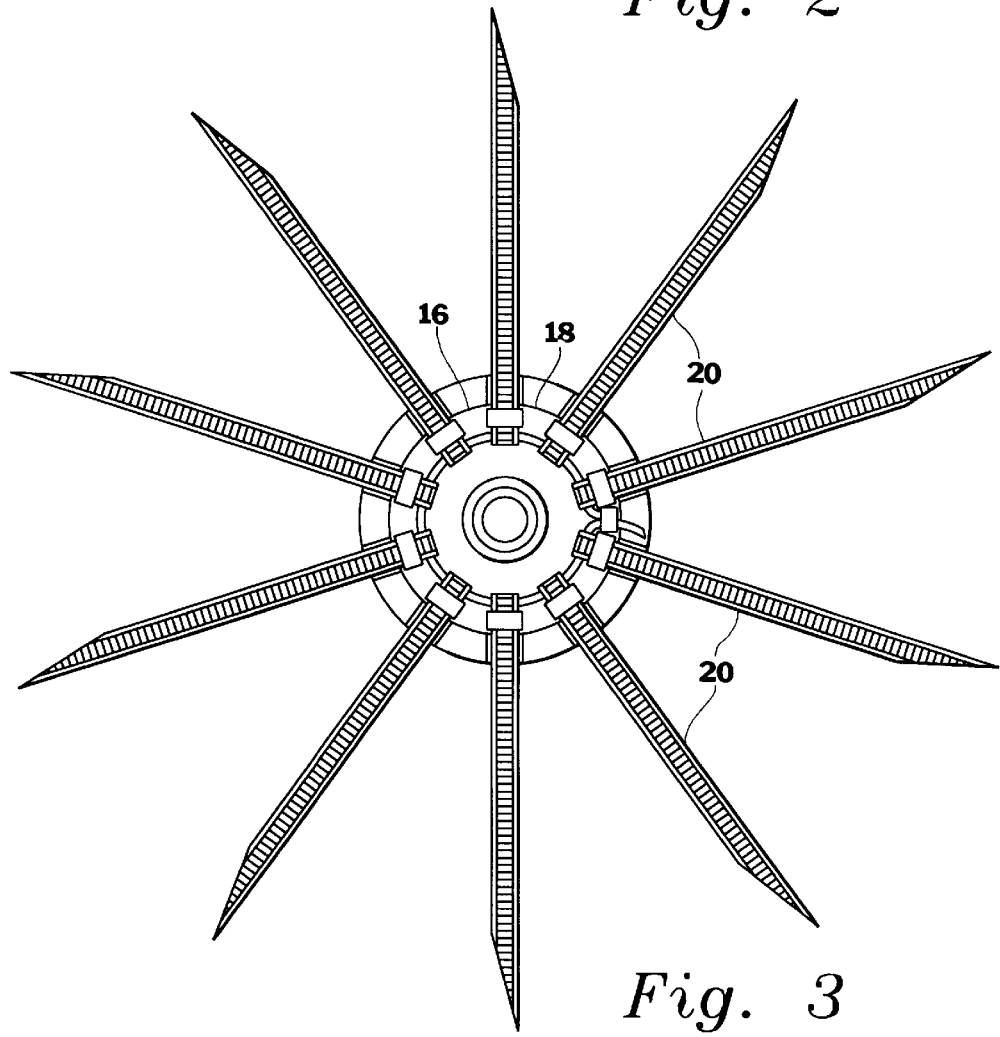
FIG. 3 is a top plan view of the rotary cutting assembly of the instant invention, with the removed therefrom.

FIG. 1 illustrates a preferred embodiment of a rotary cutting assembly 10 in accordance with the principles of the present invention. The rotary cutting assembly 10 is configured and intended to be fitted to a rotary shaft 12 of a weed trimming device 14. The rotary cutting assembly 10 comprises a cutting member 16 which includes a hub 18 and a plurality of cable ties 20 secured to the hub 18 such that a spoke pattern is formed as seen in FIG. 3. A typical cable tie includes an elongated toothed strap, a head portion integral with the strap having an opening configured to receive the strap, and a locking means disposed within the opening for engaging and gripping the strap. Each of the cable ties 20 can be secured to the hub 18 by first wrapping the strap thereof around the hub 18, then inserting the strap through the opening of the head portion, and pulling the strap until the cable tie is tightened around the hub 18. Referring to FIG. 2, the straps of the cable ties 20 which extend outward radially from the hub 18 of the cutting member 16 are capable of slicing through targeted vegetation as the rotary shaft 12 of the weed trimming device 14 causes the rotary cutting assembly 10 to rotate. It should be noted that the hub 18 of the instant invention can also be constructed with a cable tie formed in a loop.

The cutting member 16 is preferably utilizes cable ties that are sufficiently heavy and durable to cut through dense vegetation while being capable of resisting a wide range of dynamic stresses that may be placed thereon during normal operation. Cable ties are generally molded of plastic material and possess relatively high mass compared to the pliable nylon cords often utilized by prior art rotary cutting devices. One aspect of importance in the present invention is the ability of the cutting member 16 to cut through thick and dense vegetation due to the relatively heaviness of the cable ties 20 and consequently high kinetic energies is achieved during normal operation of the weed trimming device 14. In addition, since the cutting member 16 of the present invention utilizes cable ties, the tensile strength of 50 to 175 pounds can be achieved depending on the type of cable ties used. Accordingly, by incorporating cable ties possessing high tensile strength, the cutting member 16 is capable of resisting a wide range of dynamic stresses that may be place thereon during normal operation of the weed trimming device. Moreover, even if one of the cable ties 20 secured to the cutting member 16 is damaged, the damaged cable tie can be easily replaced with another one without having to replace the entire cutting member 16.

Finally, as seen by referring back to FIG. 1, a preferred embodiment of the instant invention contemplates encasing the cutting member 16 between a top cover 22 and a bottom casing 24. The bottom casing 24 includes a semi-dome shape portion which is sized to engage the outer periphery of the top cover 22 to encapsulate the cutting member 16 in the center thereof to ensure that the hub 18 and the head portions of the cable ties 20 remain protected and insulated from the majority of environmental elements typically encountered by the weed trimming device 14 which can be detrimental to the life of the cable ties 20. The bottom casing 24 has slots 26 disposed upon the upper edge thereof so that the straps of the cable ties 20 may extend outwardly therethrough. A bore 28 extending vertically through the bottom casing 24 so that the rotary shaft 12 of the weed trimming device 14 may be inserted into the bore 28 to attach the rotary cutting assembly 10 to the weed trimming device 14. As seen in FIGS. 1 and 2, the rotary cutting assembly 10 can be secured to the rotary shaft 12 of the weed trimming device 14 via a bolt 30 or any other fastening means as would be appreciated by those skilled in the art. The bottom casing 24 also includes a locking piece 32 which fits into a notch 34 formed on the weed trimming device 14 to facilitate rotation of the rotary cutting assembly 10.

While the embodiments of the present invention are disclosed in relation to the rotary cutting assembly having the disc shaped top cover 22 and the semi-dome shaped bottom casing 24, it should be noted that the bottom casing 24 and the top cover 22 disclosed herein can be of any other suitable configuration capable of securely attaching the cutting member 16 to the rotary shaft 12 of the weed trimming device 14. Many specific details contained in the above description merely illustrate some preferred embodiments and should not be construed as a limitation on the scope of the invention. Many other variations are possible.

What is claimed is:

1. A rotary cutting assembly for use with a weed trimming device for cutting vegetation, said weed trimming device having a rotary shaft, said rotary cutting assembly comprising:

a) a cutting member having a hub and a plurality of cable ties secured to said hub such that a spoke pattern is formed, the hub being further formed of a cable tie; and b) attachment means for securing said cutting member to said rotary shaft of said weed trimming device, whereby rotational energy which is applied to said rotary shaft is consequently transferred to said cutting member thus causing said cutting member to rotate.

2. The rotary cutting assembly as recited in claim 1, wherein the cable ties are molded of plastic material and have sufficiently heavy and durable construction to cut through dense vegetation while being capable of resisting a wide range of dynamic stresses that may be placed thereon during normal operation of the weed trimming device.

3. The rotary cutting assembly as recited in claim 2, wherein attachment means comprises a top cover and a bottom casing, said top cover and bottom casing encasing the hub therebetween, said bottom casing being defined in part by a semi-dome shaped portion which is sized to engage the outer periphery of the top cover such that the hub is encapsulated in the center thereof between said top cover and bottom casing, whereby the hub and the head portion of the cable ties remain protected and insulated from dirt and other environmental elements which tend to negatively effect the life of the cable ties.

4. A method of making a cutting member, to be used with a weed trimming device for cutting vegetation, with a plurality of cable ties, each of said cable ties comprising a toothed strap, and a head portion having an opening configured to receive the toothed strap, said head portion having locking means for engaging and gripping said strap, said method comprising steps of:

a) construction a hub by forming a loop with one of said cable ties;

b) securing another one of said cable ties to said hub such that said strap of the cable tie extend outward radially therefrom; and c) repeating step (b) until a spoke pattern is formed.

* * * * *